United States Patent [19]

Friedman

[11] Patent Number: 4,475,593
[45] Date of Patent: Oct. 9, 1984

[54] METHOD FOR PROFILE CONTROL AND CONFORMANCE CORRECTION

[75] Inventor: Robert H. Friedman, Houston, Tex.

[73] Assignee: Getty Oil Company, Houston, Tex.

[21] Appl. No.: 460,196

[22] Filed: Jan. 24, 1983

[51] Int. Cl.³ .......................................... E21B 33/138
[52] U.S. Cl. ..................................... 166/281; 166/295
[58] Field of Search ........................ 166/281, 294, 295

[56] References Cited

U.S. PATENT DOCUMENTS

| | | | |
|---|---|---|---|
| 2,294,078 | 8/1942 | Dow et al. | 166/281 |
| 2,842,338 | 7/1958 | Davis et al. | 166/295 |
| 3,635,289 | 1/1972 | Van Dyr | 166/295 |
| 3,721,295 | 3/1973 | Bott | 166/295 |
| 3,724,551 | 4/1973 | Troscinski et al. | 166/295 |
| 3,749,174 | 7/1973 | Friedman et al. | 166/281 X |
| 3,811,508 | 5/1974 | Friedman | 166/294 |
| 3,865,189 | 2/1975 | Friedman | 166/294 |
| 3,866,684 | 2/1975 | Friedman | 166/294 |
| 3,866,685 | 2/1975 | Friedman | 166/294 |
| 3,876,438 | 4/1975 | Friedman et al. | 166/294 |
| 3,893,510 | 7/1975 | Elphingstone et al. | 166/295 |
| 4,328,864 | 5/1982 | Friedman | 166/295 X |
| 4,352,396 | 10/1982 | Friedman | 166/295 |

*Primary Examiner*—George A. Suchfield
*Attorney, Agent, or Firm*—Arnold, White & Durkee

[57] ABSTRACT

Methods are provided for selectively placing a barrier to fluid flow within water rich strata or played out strata of a subterranean formation, the barrier being established at some distance remote from a wellbore. The methods involve first washing a desired volume of formation with an acid solution such as HCl. The acid solution is effective to extract and remove polyvalent metal ions from the formation material. Next an acidified resin emulsion composition comprising an oil soluble, acid stable resin is injected into the formation. The resin emulsion traverses the washed region without plugging. When the resin reaches the outer edge of the washed region the acidified emulsion extracts metal ions adsorbed to the unwashed formation material. The extracted polyvalent metal ions are effective to demulsify and coalesce the resin, thereby establishing a relatively impermeable barrier to subsequent fluid flow.

The methods of this invention have application in a wide variety of profile control techniques for effecting conformance or sweep efficiency in oil bearing subterranean formations.

20 Claims, No Drawings

METHOD FOR PROFILE CONTROL AND CONFORMANCE CORRECTION

BACKGROUND OF THE INVENTION

This invention relates to profile control techniques for subterranean formations; and more particularly this invention relates to methods of selectively establishing a barrier to fluid flow within subterranean formations.

The principal strategies of oil recovery processes focus on recovering the greatest amount of oil with minimal loss of advancing oil or flooding fluids to thief zones or played out zones, and with minimal production of connate water.

In the drilling and production of fluid mineral deposits such as petroleum oil and gas from subterranean reservoirs, the presence of connate water (usually in the form of an aqueous brine solution) is a continuing problem. In almost every subterranean formation wherein either petroleum oil or gas is present in quantities which make production practical, water is also found to be present. Usually, certain portions or strata of an oil bearing formation may be considered oil-rich; and other portions or strata of the formation may be considered water-rich.

Production of connate water along with oil or gas from a producing formation is not desired for many reasons, among them being the extra production expenses encountered, the necessity for separating the oil and water following production, and the extra concern in disposing the undesired brackish water which is a pollutant to the surrounding terrain.

Another problem associated with oil recovery processes is the existence of played out zones. After an oil bearing formation has been worked for a time, some of the oil rich strata will have been depleted of recoverable oil or "played out". In subsequent production processes it is uneconomical and inefficient to continue expending production fluids to these played out zones. Such played out zones have little oil available for production and because of their initial accessibility for oil production these played out preferentially consume subsequently injected production fluid to the exclusion of the remaining oil bearing strata.

The presence of water rich strata and played out areas is especially critical in those instances wherein a post primary recovery process is employed which utilizes a liquid flooding medium such as water (e.g. a waterflood operation) that is injected into the formation as through an injection well. By the very nature of such processes, a relatively large amount of injected water will be produced at the producing well or wells. The focus of the problem in such situations is to avoid or plug the water rich strata and played out areas in an effort to prevent thief of the advancing oil and flooding compositions by water rich strata or played out zones and to maintain a high oil to water ratio of fluids recovered from the formation.

The problem as set forth above and the many disadvantages encountered have been recognized by the oil and gas production industry for many years. Many efforts have been made to solve the problem in whole or in part to yield production at a more favorable oil-to-water production ratio and to provide for more complete recovery of available oil in subsequent waterflooding, steam injection, and surfactant flooding operations.

One prior art attempt at solution of the problem has been to use various solvents to selectively or preferentially plug water-rich portions or create barriers to water flow.

Applicant himself has proposed various solutions. See, for example, Applicant's prior art U.S. Pat. Nos. 3,749,174 issued July 31, 1973; 3,811,508 issued May 21, 1974; 3,865,189 issued Feb. 11, 1975; 3,866,684 issued Feb. 18, 1975; 3,866,685 also issued Feb. 18, 1975; 3,876,438 issued, Apr. 8, 1975; and 4,328,864 issued May 11, 1982.

Many of the prior art methods have been at least partially successful, and have afforded at least partial solution to the problem in certain instances and under certain well conditions. Nevertheless, the problem mentioned above still plagues the industry and remains critical. Indeed, with the rapid increase in production costs and the enforcement of pollution regulations by various governmental agencies, the industry is in very great need for a practical and inexpensive solution to this long-felt problem.

One of the primary difficulties with the prior art solutions is their impracticality for use in most situations because of the expense involved. It must be remembered in connection with the methods of this type that, typically, huge volumes of materials must be injected into the formations. Since the oil or gas which is produced is of limited value to begin with, and since production expenses are already high, any material injected into the well for selective plugging or for any other reason must, to be at all practical, be quite inexpensive. Most of the methods of the prior art known to Applicant entail the use of materials which are much too expensive to use in large volumes, in the typical situation encountered by the driller or operator.

Another major difficulty faced by the industry, is the inability to place a plug or create a horizontal or vertical barrier to fluid flow at some desired distance remote from but somewhat concentric to a wellbore. For example, to correct a steam override problem it would be desirable to establish a fluid flow barrier around a producing wellbore but at some distance remote from the wellbore. Such a barrier would then deflect uprising steam from dissipating into an upper played out zone and direct the steam through a lower producing zone to the production well. Heretofore, there has been no inexpensive or selective mechanism to establish a flow barrier along the length of a borehole or some portion thereof, but remote from it.

SUMMARY OF THE INVENTION

This invention provides methods of profile control in subterranean formation structures wherein a barrier to fluid flow can be selectively established at some desired distance remote from a wellbore. Selectivity is evidenced in two fashions. First, a plug can be selectively effected at some desired distance from a fluid injection wellbore. Second, the plug is selectively established in zones of high water saturation while zones of high oil saturation are substantially unaffected.

The methods of this invention utilize extractable polyvalent metal ions extractable from reservoir formations to trigger demulsification of an injected acidified resin composition. The resin barrier can be selectively established by first washing a region of metal ions where no barrier is desired. Thereafter, the injected resin will traverse the washed zone. At the edge of the washed zone, the resin emulsion will encounter and extract metal ions adsorbed to the formation. The indigenous polyvalent metal ions then trigger demulsification and coalesence of the resin to create a fluid impermeable barrier.

In accordance with the invention, methods are provided wherein an aqueous acid solution capable of extracting metal ions from a formation structure is injected into a wellbore and through the formation. The acid solution is effective to extract and remove metal ions especially ferric and ferrous ions from the formation structure for some distance remote from the wellbore. After the acid solution wash is completed, an acidified resin emulsion composition is introduced through the wellbore and into the formation. The acidified resin emulsion composition, which comprises an oil soluble, hydrocarbon resin emulsified with an acid stable surfactant, is susceptible to demulsification upon contact with a sufficient concentration of polyvalent metal ions. The acidified resin emulsion traverses without change through the region previously washed of metal ions. When the resin emulsion reaches the outer edge of the washed zone, the acid of the emulsion composition is effective to extract metal ions from the unwashed formation structure of the water rich strata, whereupon the resin emulsion demulsifies and coalesces in water rich strata or played out zones to form a barrier impermeable to subsequent fluid flow. As the resin emulsion contacts the unwashed oil rich strata, the oil coated formation particles are substantially not effected by acid extraction. Moreover, since the resin is oil soluble, no plugging occurs where a high oil saturation exists even if a sufficient amount of metal ions were extracted to induce demulsification.

Thereafter, oil may be pushed through the formation by use of a fluid flooding medium such as water flooding or steam, whereby the flooding medium selectively flows through the oil rich strata of the formation and bypasses strata having affinity for water.

In a second embodiment of this invention an acidified resin emulsion composition comprising an oil insoluble resin emulsified with an acid stable surfactant is injected after the acid prewash step. The oil insoluble resin demulsifies at the outer edge of the washed zone. Due to relative oil, water solubilities of the emulsified resin, the resin preferentially plugs regions of high water saturation rather than oil rich strata, despite the fact that the resin is oil insoluble.

Use of this second embodiment encompassing an oil insoluble resin is especially desirable for plugging thief zones prior to surfactant flooding processes. If the resin plug were oil soluble then the surfactant flood would quickly dislodge it, whereas when the plug or barrier oil insoluble (and coincidently water insoluble) the plug remains relatively uneffected by the advancing surfactant flood.

The methods of this invention are useful in a wide variety of well profile control techniques, including conformance control, steam override control, thief zone control, and water coning control.

DETAILED DESCRIPTION OF PREFERRED EMBODIMENTS

The invention will be described with reference to particularly preferred embodiments which constitute the best mode known to the inventor at the time of this application.

In accordance with a preferred embodiment of this invention a subterranean formation is selected using customary techniques of the art. Principally, the subterranean formations selected will be those formations which are thought to contain significant quantities of recoverable petroleum oil or gas. The formations generally have some portions which are relatively oil-rich and other portions which are relatively water-rich. Moreover, the formation selected is one containing polyvalent metal ions susceptible to extraction from the formation structure by acid solutions. The methods of this invention have been found to be most useful in formations containing extractable ferric or ferrous ions.

The formation selected is also one in which one or more wells are provided. Such wells may be drilled but in many instances will already be in place. Most often, plural wells will be present, one or more wells being utilized as injection wells and one or more of such wells being utilized as producing wells. It may be possible in some contexts to use a single well as both an injection well and producing well. The use of injection and producing wells is known in the art, as is the use of water flooding techniques, steam injection, or flooding using other liquid media as oil recovery processes.

Further in accordance with this invention a dilute aqueous acid solution is provided. The acid selected is typically a mineral acid such as HCl, $H_3PO_4$, $H_2NSO_3H$ or $H_2SO_4$ which provides a relatively low pH at dilute concentration. Moreover, such mineral acids are relatively inexpensive and readily available. A drawback to the use of mineral acids, however, is their corrosive nature. However, this invention is not confined to any particular acid constituency. For example, organic acids such as acetic acid are also suitable for use in the methods of this invention although typically such acids are more expensive than HCl. The acidity of the solution is selected to be sufficient to extract and solvate available polyvalent metal ions especially ferric and ferrous ions adsorbed to the formation structure. Generally, an acid solution having a pH of somewhat over 3 is preferred. Such an acid strength is effective to remove a substantial amount of extractable metal ions for a desired volume of formation.

Further in accordance with the methods of this invention, the acid solution is injected through a selected borehole and pushed through the formation, thereby effecting a washed zone. As the acid traverses the formation it extracts the metal ions contained by the formation structure. Moreover, as the acid solution advances, it will solvate and remove the metal ions from the formation. In general, Applicant has shown that a two pore volume of acid solution is effective to wash a desired volume of formation. It will be recognized by practitioners of this invention that various factors such as volume of acid solution, acid strength, rate of injection, formation permeability, temperature conditions and metal ion concentration will affect the extent of the washed zone.

Following the acid wash step, a volume of acidified resin emulsion is injected into the well and pushed through the formation. The acid stable resin emulsion comprises either an oil insoluble or an oil soluble, hydrocarbon resin, emulsified within an acid stable surfactant in an aqueous acid media. Further, the resin emulsion selected is one which is subject to demulsification upon exposure to a sufficient concentration of polyvalent metal ions typically ferric or ferrous ions.

The resins used herein are relatively high melting point hydrocarbons. In practice, resins are actually mixtures of hydrocarbon materials and consequently do not have a sharp melting point. Typically as temperature increases a resin goes from solid to tacky semisolid to liquid. Resins are often characterized by their softening point, which corresponds to the temperature midway through the semisolid stage. As will be appreciated by those skilled in the art, a resin selected for the methods of this invention should necessarily have a softening point near that of the formation temperature or fluid flow conditions. If the softening point is too low, there will be little viscosity to maintain a barrier at high temperatures. On the other hand if the resin selected has a softening point which is significantly higher than formation conditions, then demulsification of the resin results in granular particles too small and too hard to coalesce.

Resins are available in a large range of softening points. In addition, many materials not generally used as resins, asphaltenes for example, could serve as resins within the frame work of this invention.

A resin emulsion is a resin which has been emulsified into an internal phase of resin particles on the order of 20 micron size and an external water phase by use of a surfactant. Necessarily, it will be recognized in the context of this invention that the surfactant used should be stable to acid. On a commercial level only a few such resin emulsions are currently available. Most of these however have relatively low softening points. As a result, Applicant has found it advantageous to custom formulize the resin emulsion, which will be described in more detail in the examples.

After the resin emulsion has been prepared, it can be acidified to a desired acid range pH, or suitably buffered in the pH range from about 1.5 to 3.5. Applicant has observed that varying the acid strength often determines the lateral extent of the plug established. Buffering agents desirable for purposes of this invention include phosphoric acid and sulfamic acid buffer systems. Where no insoluble phosphates will be formed, phosphoric is preferable because it is cheaper; while in formations having ions which will form insoluble phosphates with phosphoric acid, sulfamic acid buffer systems are desirable.

Next this acidified resin composition is injected into the wellbore and forced through the formation. As the resin emulsion composition traverses that region previously washed by the acid solution, no metal ions are available for extraction. Consequently, the resin emulsion traverses unchanged. When the acidified resin emulsion reaches the outer edge of the washed zone some distance from the wellbore, the acidified resin is effective to extract and solvate the metal ions. The extracted polyvalent metal ions cause the resin particles to coalesce and demulsify from the emulsion. The coalesced resin droplets effectively plug the pore spaces of the water rich formation structure or played out zones thereby creating a barrier to subsequent fluid flow. The barrier is established over a relatively large distance, somewhat concentric with the wellbore and at some desired distance remote from the wellbore.

Further it should be apparent that as the resin emulsion, which comprise an oil soluble resin, contacts an oil rich region no plugging occurs even if extractable metal ions are present. In situations where the resin emulsion comprises an oil insoluble resin, the relative oil, water solubilities of resin will cause the resin to preferentially coalesce in the water rich strata as opposed to the oil rich strata.

Following the selective plugging of the formation in the manner described above, oil is recovered from the formation. This may conveniently be done by utilizing a liquid or steam medium in a manner well known in the art. Thus, water, steam or other suitable flooding medium may be injected into the formation through one or more injection wells and pushed through oil rich portions of the formation toward one or more producing wells.

Oil is then produced through the producing well or wells, at enhanced oil/water ratios than would be otherwise obtainable. Moreover, the amount of flooding fluid is conserved with the realization the flooding operation is being conducted through a more confined reservoir volume.

Following the methods of this invention, various well profile control strategies can be effected. One such conformance application involves correcting steam override. In such a situation there is an upper zone traversing a formation from which substantially all the oil has been removed and a lower zone which still contains most of its oil. Oftentimes, the steam injected at the terminal port of the injection well will rise too soon into the played out zone which offers the path of least resistance. It therefore is desirable to place a barrier to fluid flow at some distance away from the producing well such that the barrier will deflect the rising steam from the upper zone and direct the advancing fluid flood through the lower oil rich zone to the producing well.

Another conformance application of this invention rests in avoiding the persistent problem of water coning. Consider a well completed into the top of an oil zone. At some distance below the well is an aquifer, a water bearing sand, which is fed perhaps from an outcrop many miles away. As the oil is removed the water rises pushing the oil ahead. Often, however, the water rises too fast, coming upward into the pressure sink which the well creates. This cuts off the oil from the well and predominantly water is produced although plenty of oil remains. To correct such a situation it would be desirable to set a pancake-like plug below the well and above the aquifer. The methods of this invention are envisioned to create such a barrier to avoid water coning development.

The steam override and water coning problem are examples wherein the heterogeneity of permeability exhibited between water rich strata and oil rich strata are at a gross disparity. Sometimes this problem is referred to as "thief zone" since a preponderance of any force injected fluid will be drawn off by the zone of water saturation generally having a lower permeability and higher pore volume than the available oil rich strata. In cases where the disparity is less pronounced, the problem of directing injected fluid to the oil rich strata while avoiding the water rich strata is termed conformance or sweep efficiency. Generally a less concentrated resin emulsion is adequate for conformance techniques.

The term "profile control" as used herein is generic to the various conformance control techniques employed to overcome steam override, water coning, thief zones and related permeability disparity problems.

To further illustrate the invention several laboratory experiments have been performed by the Applicant. The examples which follow, which should not be considered as limiting the invention but rather only as exemplary of the various embodiments are based on those laboratory results.

The resin emulsion utilized in the plugging experiments was prepared as follows. Picconol AA101 a 50% solid aqueous emulsion was obtained from Hercules, Inc., Wilmington, Del. Picconol AA101 is a proprietary product of Hercules, Inc. comprising neutral synthetic hydrocarbon resins derived from a variety of aliphatic, aromatic, and terpene monomeric and other low molecular weight hydrocarbons. Also included in the resin emulsion is an anionic, acid stable surfactant which is about 6% of the resin by weight. The resin emulsion is further characterized in that it has a softening point of about 160° F. (71° C.), pH 4.5, 1 micron particle size, 0.98 specific gravity, surface tension of 29 dynes/cm, viscosity of 60 cps at 25° C., a viscosity of less than 1 cp at steam temperature, and intolerant to polyvalent metal ions such as iron, calcium and aluminum.

According to this invention Picconol AA101 was diluted to a 5% solid emulsion using a 0.27 M phosphoric acid/0.045 M $Na_2HPO_4$ buffer, such that the pH of the resulting emulsion was 1.75.

On request, Hercules, Inc. was able to supply Applicant with resin emulsion compositions similar to Picconol AA101 but with higher softening points. Both a 95° C. and 100° C. softening point resin emulsified identical to Picconol AA101 were provided.

EXAMPLE I

Displacement and plugging experiments were run in 2¼×18 inch stainless steel tubes packed with Kern River sand which had been solvent cleaned. The cleaning was necessary for two reasons. First, the acid cannot extract ions from oil covered rock; and second, the resin itself is oil soluble and will not effect plugging where a high oil saturation exists. The initial packing of tubes with formation material exhibited a permeability of 12 to 15 darcies.

The tube was heated to 150° F. to simulate formation temperature. Next the buffered resin emulsion (160° F. softening point) described above was introduced to the tube. After three pore volumes of resin emulsion were passed through the tube a considerable pressure developed across the tube. No resin emerged from the tube and permeability subsequently measured was 7.48 md, less than 0.1% of the original pack.

EXAMPLE II

Using the resin plugged pack of EXAMPLE I, water injection experiments were conducted at increasing temperatures. The tube was in a nearly vertical position in the oven and injection was from the top down. The plug held to above 200° F. (94° C.) but broke down when the temperature of the water passed 250° F. (122° C.). At that temperature, the viscosity of the 160° F. softening point resin is very low and the pressure across the 18 inch tube was 30 psi.

EXAMPLE III

For higher temperature experiments the 100° C. resin emulsion was used. The resin emulsion as supplied by Hercules was diluted with 0.27 M phosphoric acid to 5% resin solid emulsion. The resulting pH was 1.34.

The tube packed with solvent cleaned Kern sand was placed in the oven in the nearly vertical position as described before. The tube was heated to 235° F. (112° C.).

Sufficient tubing was coiled inside the oven to ensure that fluid entering the packed column would be at oven temperature. Connected to the outlet side and outside the oven was a 6-in. long pipe nipple filled with water which was connected to a backpressure regulator.

From the downstream of the backpressure regulator was a length of tubing leading to a gradual cylinder so that output could be measured. The function of the pipe nipple was to serve as a trap for solid particles which might foul the backpressure regulator. Injection of the acidified resin emulsion (5% solids) was carried on for 3 pore volumes with no plugging occurring. It was surmised that no coagulation had occurred because the extraction by the acid had been too rapid, causing the resin to precipitate into fines.

EXAMPLE IV

To induce a thicker plug a new pack was used. The pore volume was 410 mL. This time the resin emulsion (100° C. softening point) was buffered with phosphoric acid-phosphate to a pH of 1.75 as had been the case in Example I. The backpressure regulator was set at 25 psi. After injection of about 1 pore volume at 1.66 mL/min, pressure began to rise and continued to about 50 psi by the past of the second pore volume (960 ml). Water was then injected at a temperature of 262° F. Pressure varied between 40 psi and 60 psi while 275 mL of $H_2O$ were injected. At the conclusion of the injection, pressure across the tube was 45 psi.

The tube was removed from the oven and cooled to room temperature. When the tube was opened, it was found that the 4 to 5 inches nearest the injection end were rock hard but that farther into the tube was no resin. At room temperature, the 100° C. s.p. resin is quite solid. Although adequate plugging had occurred it was observed that some resin precipitation may have been too rapid even at pH 1.75 and that better results might be obtained if the buffer pH was moved up to a higher value, perhaps 2.0.

EXAMPLE V

A no plug experiment was run demonstrating the use of an acid wash to prevent subsequent resin plugging.

A column with Kern River formation sand was placed in the oven (which was maintained at 150° F.). As previously, the tube had been evacuated and charged with water prior to the resin. Two pore volumes of 2N HCl were injected. By the end of the first pore volume, the effluent had the characteristic green color of ferrous ion. This color continued through most of the 200 mL (equivalent of 1 pore volume) water buffer which followed.

Resin emulsion Picconol AA101 at 5% containing 0.27 M $H_3PO_4$ and 0.045 M $Na_2HPO_4$ was injected. After about 1 pore volume the resin emulsion began to be produced, visually identical with the injection material. In the no plug run, resin emerged unchanged and pressure did not increase as long as the run continued (about 1 pore volume beyond first resin production).

EXAMPLE VI

The acid washed Kern sand extract from EXAMPLE V was collected and analyzed. Atomic adsorption analysis showed ferric and ferrous ion to be the main constituents of the acid extract.

Adding this extract to the resin emulsion (100° C. softening point) was effective to precipitate the resin. The precipitated resin was a fine powder until the solution was heated. Then the particles clumped together.

To illustrate a moderate conformance control useful in water flood techniques, a lower resin concentration was used as well as a weaker acid wash.

EXAMPLE VII

Berea cores 2"×2"×12", (5 cm×5 cm×30 cm) equipped with fittings and cast in resin were provided. During experiments the cores were kept in an oven maintained at 150° F. The cores had a pore volume of 148.1 ml (18.9%) and a permeability of 233.8 md.

The resin emulsion was diluted to a 0.125% solid emulsion in 0.1 N acetic acid. After the core had reached 150° F., the resin emulsion composition was injected continuously. In the beginning the injection pressure was a fraction of 1 psig. At a constant rate, the pressure rose nearly linearly over the course of the run to 3.5 psi. No resin emerged from the core during the 865 ml (4.84 PV) injected. At the end of the run, the permeability to water was remeasured and found to be 12.9 md, a reduction of 94%.

EXAMPLE VIII

In another experiment, two cores were used. These were charged with salt water and then with oil. One core (Core B) was then waterflooded to residual oil. Then the two cores were connected to a common entry and water injection was continued. Both cores were kept in an oven at 150° F. Waterflooding was continued until both cores produced only water for an extended period. Then a 1% resin emulsion solution in acetic acid was injected continuously and the results observed. The resin emulsion concentration of 1%, substantially higher than that used previously, was chosen to simulate injection fluid diversion at some point from the well bore through which multiple pore volumes of the resin solution would pass. The higher concentration limited the experimental volume requirements.

A summary of the data is given in Table 1. Core A produced oil after being placed in a dual core flooding arrangement to a residual oil saturation of 0.44. Equal total volumes of the resin emulsion solution were produced during its injection. The total oil produced (with production of oil and resin included and counted as oil) resulted in final oil saturations of 0.12 for Core A and 0.18 for Core B.

TABLE 1
SUMMARY OF DATA

| | Core A | Core B |
|---|---|---|
| Pore Volume (ml) | 130 | 155 |
| Permeability to Water (md) | 214 | 212 |
| Initial Oil Saturation, $S_{oi}$ | 0.75 | 0.63 |
| Residual Oil Saturation $S_{or}$ (Core B waterflood) | — | 0.25 |
| Volume of Oil Produced in Tandem Arrangement (ml) | 40 | 0 |
| Residual Oil Saturation after Tandem Flood | 0.44 | 0.25 |
| Volume of Resin Emulsion Injected (ml) | 1000 | 1000 |
| Total Volume of Oil Produced after Resin Injection | 82 | 70 |
| Final Residual Oil Saturation | 0.12 | 0.18 |

EXAMPLE IX

This experimental approach was used to demonstrate the applicability of vacuum residuum resin to the problem of steam override in Kern River steam stripped reservoirs.

The vacuum residuum emulsion was prepared by heating a sample of vacuum residuum to 250 to 300° F. and then mixing the heated residuum in an emulsifier with slow stirring. The emulsifier selected was a mixture of two Emergy Industries products: Tryfac 610-A and Tryfac 5556 (75:25 wt %). The amount of emulsifier used was 5% based weight of the vacuum residuum.

Next, 0.116 g KOH/g emulsifier was dissolved into a portion of the water to be used to prepare the emulsion. The base solution was added slowly to the residuum-/emulsifier mixture while keeping the mixture hot (210°–220° F.). The mixture was stirred to uniformity. Boiling water was then added to the mixture with vigorous stirring until the emulsion inverted. Inversion was evidenced by a drop in viscosity and a color change from black to brown. Additional water was added to bring the concentration of solids to 40–50%.

The emulsion was heated to boiling and then while stirring slowing the emulsion was cooled to room temperature.

Sensitivity of the emulsion to $Fe++$ was demonstrated by adding a few drops of a 1% $FeCl_2$ solution to a sample of the emulsion at which time precipitation of the residuum was observed. Thermal stability of the emulsion was demonstrated by placing a sample of the emulsion in a Hoke cylinder and heating to 270° F. After cooling, the emulsion was inspected and no precipitation was found to have occurred. The viscosity of the vacuum resid was measured at 260° F. and found to be approximately 15 poises.

A stainless steel cylinder (18×2¼ in. diameter) was packed with solvent cleaned Kern River core material obtained from a depth of 1164–1169 ft. The core was connected to a vacuum pump, evacuated, and then charged with water. The pore volume of the core was determined to be 360 mL. The initial permeability to water of the core was then measured and found to be 11.9 darcies. Kern River crude was then injected into the core and the initial oil saturation was 91.4%. The core was next steam cleaned by injecting 300° F. steam into the core until there was no evidence of additional oil being produced. The core was cleaned to a residual oil saturation of 6.4%. The emulsion was diluted to a 5% solids concentration and was made 0.27 M in $H_3PO_4$ and 0.045 M in $Na_2HPO_4$ prior to injection into the core. Injection was continued until 800 mL (2.2 pore volumes) of the residuum emulsion had been injected. The pressure requirement for injection of the emulsion was 25 psi at this point. The permeability of the core was remeasured at room temperature and found to be 412.5 md. This corresponds to a 96.5% reduction in the permeability of the core. Inspection of the core afterward showed that the residuum was deposited throughout the entire length of the core indicating a plug of great depth is attainable.

EXAMPLE X

Two cylindrical stainless steel cylinders (18" long by 2¼ diameter) were packed with solvent cleaned Kern River core material obtained from a depth of 1164–1169 feet from the Orich well. Each core was connected to a vacuum pump, evacuated, and then charged with water. The total pore volume of the two cores was determined to be 690 mL. The initial permeabilities to water of cores I and II were found to be 10.7 and 11.2 darcies, respectively. Sulfamic acid (0.2 N) was injected into core I, at 150° F., until the effluent was free of dissolved iron as evidenced by a lack of green color. The core was then flushed with water. The two cores were then connected and the permeability to water was found to be 10.2 darcies.

The emulsion prepared according to the specifications described in EXAMPLE IX was diluted to a 5% solid concentration and was made 0.2 N in sulfamic acid prior to injection into the cores. Injection was continued at 150° F. until 3 liters (4.3 collective pore volumes) of the resid emulsion had been injected.

The pressure requirement of the across the system was 30 psi at this point versus 4 psi initially and the flow rate diminished. The permeability of the connected cores was remeasured at room temperature and found to be 180 md. This corresponds to a 98% reduction in the collective permeability of the cores. The two cores were then separated and their individual permeabilities were remeasured. The permeability of core I was found to be 10.1 darcies, corresponding to a 5.6% reduction in permeability. The permeability of core II was found to be 366 md, corresponding to a 96.7% reduction in permeability.

Core II was then subjected to steam flooding beginning at 212° F. and continued until evidence that precipitated resid had been dislodged was found. This occurred at 250° F. The temperature was immediately lowered to prevent significant loss of resid and further steam flooding at 240° F. was conducted with no further loss of resid.

EXAMPLE XI

To be certain that a plug made of resid emulsion would withstand the temperature of the reservoir, efforts were made to "upgrade" the resid by raising the softening point. This was accomplished by partially dehydrogenating the material with diluted sulfuric acid. Lowering the H/C ratio produced a more asphaltic resid with the desired increase in softening point.

A sample of the vacuum resid was treated by boiling it in 6N $H_2SO_4$ to complete dryness. The treated resid was then mixed with untreated resid in a 75:25 ratio by weight and emulsified by the method outlined in Example IX with the exception of diluting the emulsion to 25% solids rather than 50% solids. Sensitivity to iron and thermal stability of the emulsion was demonstrated as previously outlined with identical results.

A cylindrical stainless steel cylinder (18" long by 2¼" diameter) was packed with solvent cleaned Kern River core material obtained from a depth of 1161-1171 feet from the Kern well. The core was connected to a vacuum pump, evacuated, and then charged with water. The pore volume of the core was determined to be 340.2 mL. The initial permeability to water of the core was found to be 11.0 darcies. The emulsion was diluted to a 5% solids concentration and was made 0.2 N in sulfamic acid prior to injection into the core. Injection, at 150° F., was continued until 950 mL (2.8 pore volumes) of the resid emulsion had been injected. The pressure requirement of the resid was 28 psi at this point. The permeability was remeasured and found to be 313 md. corresponding to a 97.2% reduction in permeability. The core was then subjected to steam flooding until evidence was found that precipitated resid had been dislodged. This occurred at a temperature in excess of 286° F. The temperature was then lowered to 284° F. and further steam treating resulted in no further loss of resid. This method raised the breaking point of the plug by at least 34° F.

EXAMPLE XII

This example demonstrates the applicability of non-oil soluble resin to a thief zone problem in the Ventura Field.

Three emulsions of oil insoluble resins were prepared, from Bresin-2, Terate 101, and Terate 131, non-oil soluble resins obtained from Hercules Incorporated. Instead of the emulsifier ratio of 75:25 of EXAMPLE IX, the ratio was changed to 90:10 and the emulsion was diluted to 25% solids instead of 50% solids. All three resins were tested in oil up to 200° F. and found to be insoluble. Sensitivity of the emulsion to iron was demonstrated by adding a few drops of a 1% $FeCl_2$ solution to a sample of each emulsion at which time precipitation of the resins was observed. It was further observed that the emulsion of Bresin-2, was the most sensitive to the $FeCl_2$ solution and was therefore selected for further testing. Thermal stability of the Bresin-2, emulsion was demonstrated by heating a sample to 270° F. After cooling, the emulsion was inspected and no precipitation was found to have occurred.

A stainless steel cylinder (18×2¼ in. diameter) was packed with solvent cleaned Ventura core material obtained from a depth of 6736-6738 ft from the Lloyd 235 well. The core was connected to a vacuum pump, evacuated, and charged with a 3% NaCl solution. The pore volume of the core was determined to be 352.5 mL. The initial permeability to water of the core was then measured and found to be 11.14 darcies. The emulsion was diluted to a 5% solids concentration and was made 0.2 N in sulfamic acid prior to injection into the core. Injection was continued at 150° F. until 1250 mL (3.5 pore volumes) of the resin emulsion had been injected. The pressure required for injection of the emulsion was 28 psi at this point. The permeability of the core was remeasured at room temperature and found to be 0.376 darcies. This corresponds to a 96.6% reduction in the permeability of the core.

A surfactant flood material was then prepared by mixing a weight ratio of 2.17 grams Petrostep HMW to 1.56 grams Biosoft D-62 to 0.75 grams isobutyl alcohol to 45.52 grams synthetic Ventura injection water in a steam bath with stirring for 2 hours in a closed container. The flood material was then injected into the core at 150° F. A total of 3 liters (8.5 pore volumes) of the surfactant flood material was injected at a flow rate of 0.2 mL/sec. This was followed by a waterflood that was continued until a constant permeability could be measured. A total of 1.5 liters (4.3 pore volumes) of $H_2O$ was injected before the permeability was measured. The permeability to $H_2O$ at room temperature was measured and found to be 0.275 darcies. This corresponds to a 97.5% reduction in the original permeability of the core. The results showed that the permeability barrier was unaffected by the surfactant flood.

EXAMPLE XIII

Another experiment was conducted with residual oil present. The core material was not solvent cleaned. The tube was connected to a vacuum pump, evacuated, and charged with a 3% NaCl solution. The pore volume of the core material pack was determined to be 330 mL. The initial permeability to water was found to be 10.8 darcies. Ventura crude was injected into the tube and the initial oil saturation was 93.9%. Waterflooding was conducted until there was no evidence of additional oil being produced. This resulted in a residual oil saturation of approximately 16%. The Bresin-2 emulsion was diluted to a 5% solids concentration and was made 0.2 N in sulfamic acid prior to injection into the core. Injection was continued at 150° F. until 240 mL (7.3 pore volumes) of the resin emulsion had been injected. The pressure required for injection of the emulsion was 29 psi at this point. Nonprecipitated emulsion was produced during the first two pore volumes. The permeability of the core was remeasured at room temperature and found to be 310 md. This corresponds to a 97.1% reduction in the permeability of the core.

Although the invention has been described in terms of particular embodiments which Applicant believes to represent the best modes of the invention at the time of this application, it will be recognized by those skilled in the art that various changes may be made in the composition and method embodiments of this specification without departing from the scope of the invention as defined in the following claims:

What is claimed is:

1. A method of selectively establishing a barrier to fluid flow at some desired distance from a borehole, the borehole passing through a subterranean formation containing strata which are water-rich and other strata which are oil-rich, said formation also containing acid extractable metal ions, the method comprising the steps of:
   providing an aqueous acid solution capable of extracting metal ions from the formation structure;
   injecting a volume of said acid solution through the borehole and into said formation, the volume of the acid solution sufficient to extract and remove metal ions from the formation for some desired distance remote from the borehole;
   providing an acidified resin emulsion composition comprising a hydrocarbon resin, acidified water and acid stable surfactant, which resin emulsion is susceptible to demulsification upon contact with a sufficient concentration of polyvalent metal ions;
   passing said resin into the borehole and through the formation behind the acid solution, whereupon the resin emulsion demulsifies at a region in the formation remote from the borehole, the region containing extractable polyvalent metal ions, said demulsification being effective to establish a barrier having greatly reduced permeability to fluid flow over a relatively long period of time.

2. The method of claim 1 wherein the formation contains extractable ferric or ferrous ions.

3. The method of claim 1 wherein the aqueous acid solution is an organic acid or a dilute mineral acid.

4. The method of claim 1 wherein the aqueous acid solution is a dilute hydrochloric acid solution, phosphoric acid solution, sulfamic acid solution, sulfuric acid solution, or acetic acids.

5. The method of claim 1 wherein the hydrocarbon resin is oil soluble.

6. The method of claim 1 wherein the hydrocarbon resin is oil insoluble.

7. The method of claim 1 wherein the resin emulsion comprises a resin having a softening point about the temperature condition of the formation.

8. The method of claim 1 wherein the hydrocarbon resin comprises a vacuum residuum.

9. The method of claim 1 wherein the resin emulsion is subject to demulsification upon contact with a sufficient quantity of ferric or ferrous ions.

10. The method of claim 1 wherein the resin emulsion comprises resin emulsified with an anionic, acid stable surfactant.

11. The method of claim 1 wherein the resin emulsion comprises about ½% to about 5% resin solids and anionic, acid stable surfactant emulsified in an aqueous acid buffer solution.

12. The method of claim 1 wherein the resin emulsion composition is buffered to a pH ranging from about 1.5 to about 3.5.

13. A method of well profile control in a subterranean formation wherein a barrier to fluid flow is selectively established in water rich strata or played out strata at some desired distance from a wellbore, the wellbore passing through a subterranean formation containing strata which are water-rich and other strata which are oil-rich, said formation also containing extractable metal ions, the method comprising the steps of:
   washing away extractable polyvalent metal ions from a desired region in subterranean formation, the region having a wellbore passing therethrough;
   injecting into the wellbore and through the formation an acidified resin emulsion composition comprising a hydrocarbon resin, acidified water and acid stable surfactant, the resin subject to demulsification upon contact with a sufficient concentration of polyvalent metal ions, whereupon the resin emulsion demulsifies at the boundary of the washed region, said demulsification effective to establish a barrier to fluid flow over a relatively large distance over a relatively long period of time.

14. The method of claim 13 wherein the washing of extractable metal ion is accomplished with an aqueous acid solution.

15. The method of claim 13 wherein the metal ions extracted include ferric or ferrous ions.

16. The method of claim 13 wherein the resin emulsion comprises a resin having a softening point about the temperature condition of the formation.

17. The method of claim 13 wherein the hydrocarbon resin is oil soluble.

18. The method of claim 13 wherein the hydrocarbon resin is oil insoluble.

19. The method of claim 13 wherein the hydrocarbon resin comprises vacuum residuum.

20. The method of claim 13 wherein the resin emulsion comprises about ½% to about 5% resin solids and anionic, acid stable surfactant emulsified in an aqueous acid buffer solution.

* * * * *